(12) United States Patent
Fujimura

(10) Patent No.: US 8,006,048 B2
(45) Date of Patent: Aug. 23, 2011

(54) SIGNAL PROCESSING CIRCUIT

(75) Inventor: Kensuke Fujimura, Osaka (JP)

(73) Assignees: Sanyo Electric Co., Ltd. (JP); Sanyo Semiconductor Co., Ltd. (JP)

( * ) Notice: Subject to any disclaimer, the term of this patent is extended or adjusted under 35 U.S.C. 154(b) by 640 days.

(21) Appl. No.: 12/048,388

(22) Filed: Mar. 14, 2008

(65) Prior Publication Data

US 2008/0304350 A1    Dec. 11, 2008

(30) Foreign Application Priority Data

Mar. 15, 2007   (JP) ................. 2007-066797

(51) Int. Cl.
*G06F 12/00*   (2006.01)
(52) U.S. Cl. ........................ 711/157; 711/202
(58) Field of Classification Search .......... 711/157, 711/202
See application file for complete search history.

(56) References Cited

U.S. PATENT DOCUMENTS

| | | | |
|---|---|---|---|
| 6,282,622 B1 * | 8/2001 | Morris ............ | 711/170 |
| 6,438,063 B1 * | 8/2002 | Lee ............... | 365/230.03 |
| 6,948,046 B2 | 9/2005 | Higuchi | |

FOREIGN PATENT DOCUMENTS

JP   2004-13618   1/2004

* cited by examiner

*Primary Examiner* — Matthew Bradley

(74) *Attorney, Agent, or Firm* — Cantor Colburn LLP

(57) ABSTRACT

A signal processing circuit includes a signal processing section which generates first address data and second address data in accordance with data processing, reads data stored in an external memory based on the first address data and the second address data for performing a predetermined processing, and outputs processed data along with the first address data and the second address data, an address conversion section which, receiving the first address data and the second address data input thereto, holds at least 1 bit of the first address and outputs third address data, and also adds the at least 1 bit of the held first address data to the second address and outputs fourth address data, and a data interface which performs a writing operation or a reading operation of the data processed by the signal processing section with respect to the external memory on the basis of a time when the address conversion section outputs the third address data and the forth address data.

4 Claims, 6 Drawing Sheets

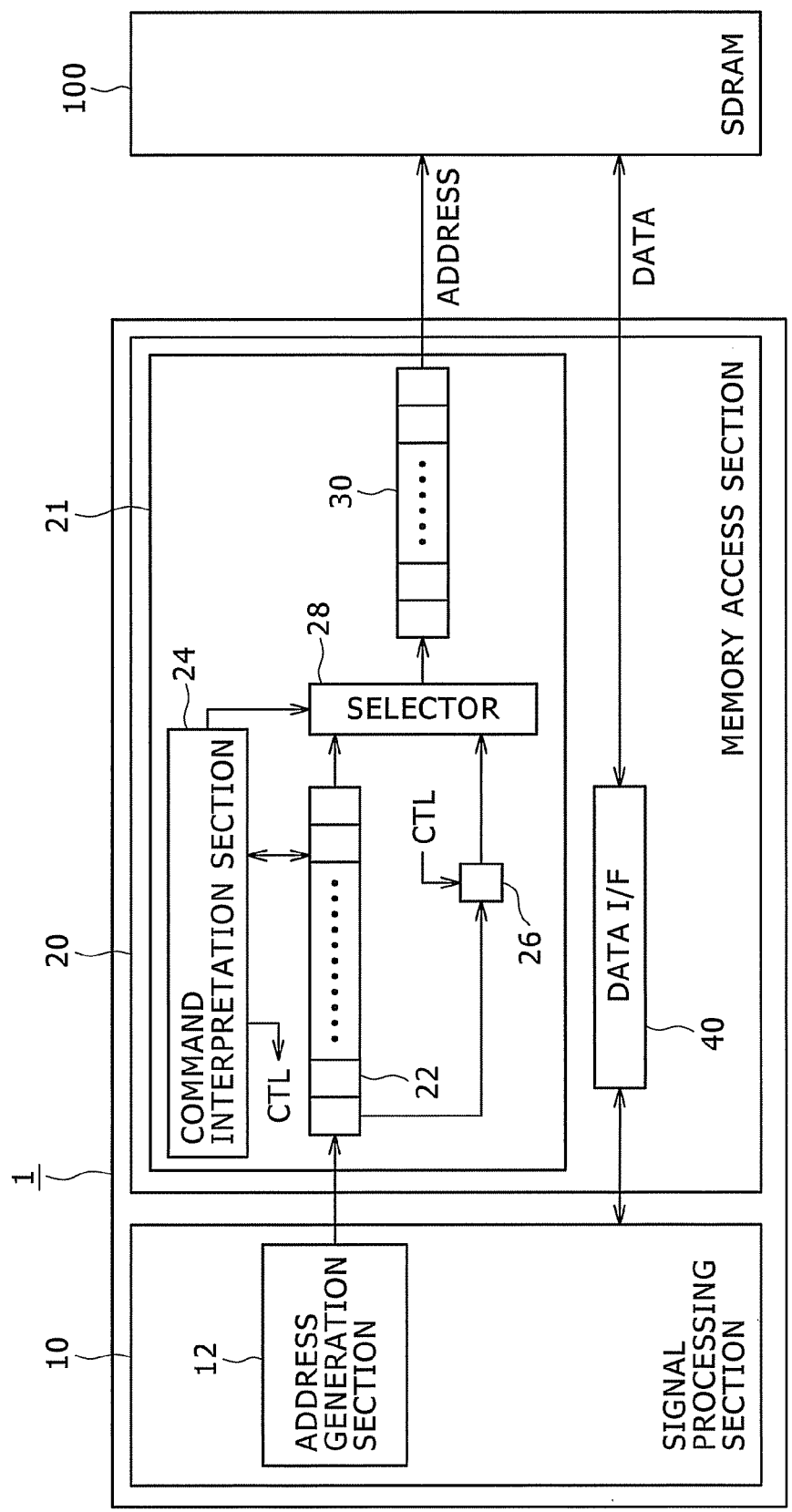
F I G . 1

US 8,006,048 B2

SIGNAL PROCESSING CIRCUIT

PRIORITY INFORMATION

This application claims priority to Japanese Patent Application No. 2007-66797, filed on Mar. 15, 2007, which is incorporated herein by reference in its entirety.

BACKGROUND

1. Technical Field

The present invention relates to a signal processing circuit which generates address data in accordance with data processing and reads out data stored in an external memory (based on the address data) for performing predetermined processing, and which generates address data in accordance with processed data and writes the processed data in the external memory in accordance with the address data.

2. Related Art

FIG. 6 shows a structure of a related art signal processing circuit 200. The signal processing circuit 200 is composed of a signal processing section 210 which performs predetermined signal processing and a memory access section 220 which writes data and address data generated by the signal processing section 210 in SDRAM (Synchronous Dynamic Random Access Memory) 100 and also reads data from the SDRAM 100 based on the address data generated by the signal processing section 210. The signal processing circuit 200 is formed on a single semiconductor substrate and is connected to the SDRAM 100.

The signal processing section 210 includes an address generation section 212 which generates address data for access to the SDRAM 100. The signal processing section 210 can be configured to decode video data such as Mpeg (Moving picture experts group), and the address generation section 212 generates address data suitable for the video data format.

The address generation section 212 generates row address data and column address data in accordance with data to be processed by the signal processing section 210, and also generates command data for access to the SDRAM 100. The command data includes, for example, an ACT command for designating a row address for access to the SDRAM 100, a WR command for writing data in the SDRAM 100 by designating a column address of the SDRAM 100, and an RD command for reading data from the SDRAM 100 by designating a column address of the SDRAM 100.

The memory access section 220 includes a register 222 which temporarily stores the command data and the address data generated by the address generation section 212 and a data interface (I/F) 240 which temporarily stores data read from the SDRAM 100 or data to be written in the SDRAM 100 to control reading and writing of data. The memory access section 220 is connected with the SDRAM 100 to output the command data and the address data stored in the register 222 to each of a plurality of terminals of the SDRAM 100 and to perform reading and writing of data with respect to the SDRAM 100 in accordance with the address data output from the register 222.

The SDRAM 100 is a memory cell array formed by row addresses and column addresses. The SDRAM 100 performs data reading and data writing operations in accordance with the command data and the address data output from the memory access section 220. The detailed structure of the SDRAM 100 will be described below.

Mpeg video signals, for example, are decoded in units of pixel blocks each formed of 8×8 pixels. If the SDRAM 100 has a storage capacity of 256 Mbits (16 Mwords×16 bits), in which case the SDRAM 100 is controlled by 13-bit row address data and 9-bit column address data, the address generation section 212 generates 13-bit row address data and 9-bit column address data in accordance with the of 8×8 pixels data format for access to the SDRAM 100.

If the signal processing circuit 200 is a circuit for decoding Mpeg video signals with high quality, it is necessary for the signal processing circuit 200 to process a larger amount of data with the increase in the image quality. Consequently, the signal processing circuit 200 requires the SDRAM 100 which is capable of storing a larger amount of data.

Here, when the SDRAM 100 having a large storage capacity is provided, the number of bits of the row address data and the column address data is changed with the increase in the storage capacity. If the storage capacity of the SDRAM 100 is increased to 512 Mbits (32 Mwords×16 bits), for example, it is necessary to control such an SDRAM 100 with 13-bit row address data and 10-bit column address data.

Accordingly, even if a 512 Mbit SDRAM 100 is connected with the conventional signal processing circuit 200 which includes the address generation circuit 212 which complies with the 256 Mbit SDRAM 100, it is not possible to use the entire storage region of the 512 Mbit SDRAM 100. Therefore, when developing a signal processing circuit which complies with a 512 Mbit SDRAM 100, it is necessary to design a new address generation section which generates 13-bit row address data and 10-bit column address data in accordance with the 8×8 pixels data format, resulting in an increase in the costs for the signal processing circuit associated with the increased development costs.

SUMMARY

In accordance with an aspect of the invention, there is provided a signal processing circuit comprising: a signal processing section which generates first address data and second address data in accordance with data processing and reads data stored in an external memory based on the first address data and the second address data for performing predetermined processing, the signal processing section outputting processed data along with the first address data and the second address data; an address conversion section which, receiving the first address data and the second address data input thereto, holds at least 1 bit of the first address data and outputs third address data, and also adds the at least 1 bit of the first address data which is held to the second address data and outputs fourth address data; and a data interface which performs a writing operation or a reading operation of the data processed by the signal processing section with respect to the external memory on the basis of a time when the address conversion section outputs the third address data and the forth address data.

BRIEF DESCRIPTION OF THE DRAWINGS

A preferred embodiment of the present invention will be described in detail based on the following figures, wherein:

FIG. 1 is a view showing a structure of a signal processing circuit according to an embodiment of the present invention;

DETAILED DESCRIPTION

Figure 2A:
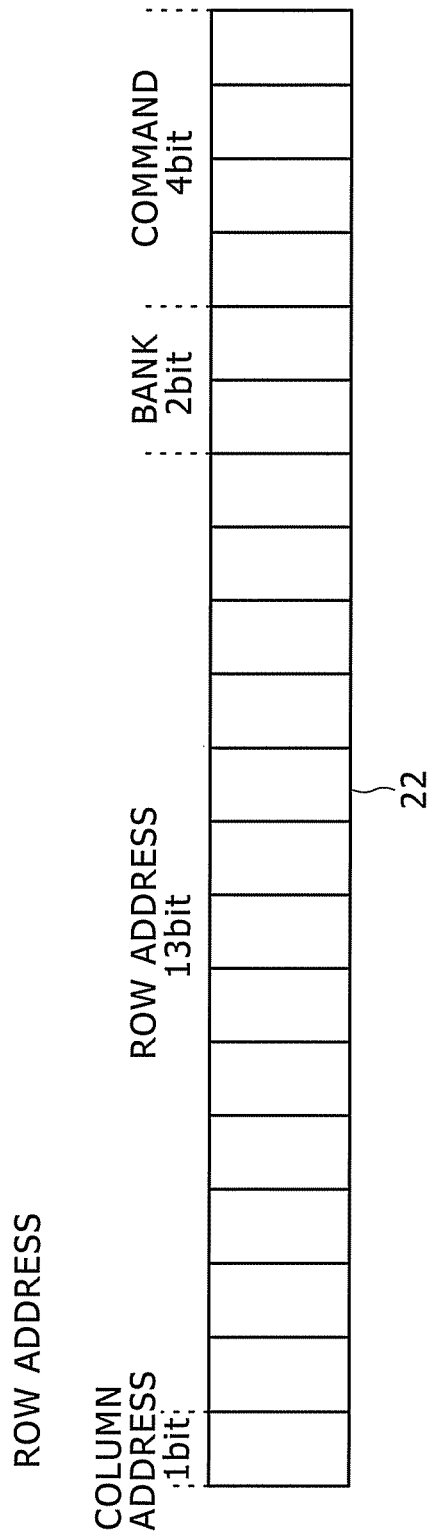
FIGS. 2A and 2B is a view showing a structure of a register 22 according to the embodiment of the present invention.

A preferred embodiment of the present invention will be described in detail with reference to the accompanying drawings.

FIG. 1 shows a structure of a signal processing circuit 1 according to an embodiment of the present invention. The signal processing circuit 1 is composed of a signal processing section 10 which performs predetermined signal processing and a memory access section 20 which writes data and address data generated by the signal processing section 10 in a SDRAM 100 and also reads data from the SDRAM 100 based on the address data generated by the signal processing section 10. The signal processing circuit 1 is formed on a single semiconductor substrate and is connected to the SDRAM 100. In the present embodiment, an example structure of the signal processing circuit 1 to which the SDRAM 100 including 13-bit row addresses and 10-bit column addresses is connected will be described.

The signal processing section 10 includes an address generation section 12 which generates address data for access to the SDRAM 100. The address generation section 12 generates 14-bit row address data and 9-bit column address data in accordance with data to be processed by the signal processing section 10, and also generates command data for access to the SDRAM 100.

The memory access section 20 includes an address conversion section 21 and a data interface (I/F) 40. The address conversion section 21 includes a register 22, a command interpretation section 24, a register, 26, a selector 28, and a register 30.

The register 22 temporarily stores the command data, the row address data, and the column address data generated by the address generation section 12. FIG. 2 shows how the command data and the address data are stored in the register 22. The register 22 may be configured by a 20-bit register, for example, which stores 4-bit command data, 2-bit bank designation data, and 14-bit address data.

The command interpretation section 24 monitors and interprets the 4-bit command data stored in the register 22 to determine whether the address data is row address data or column address data and control the register 26 and the selector 28 in accordance with the determination result. For example, when the command data is an ACT command, the command interpretation section 24 determines that the address data is row address data, and when the command data is a WR command or a RD command, the command interpretation section 24 determines that the address data is column address data.

The register 26 obtains and stores the last one bit of the data stored in the register 22 in accordance with a control signal CTL output from the command interpretation section 24. More specifically, while the command interpretation section 24 determines that the address data is row address data when detecting an ACT command, as the last one bit of the row address data corresponds to column address data in the SDRAM 100, the register 26 obtains and stores the column address data represented by the last one bit.

The selector 28 is connected with the registers 22 and 26 and selectively outputs the data stored in the registers 22 and 26 in accordance with the control signal output from the command interpretation section 24. Specifically, when the command interpretation section 24 detects an ACT command, the selector 28 selects the register 22 and outputs 4-bit command data, 2-bit bank designation data, and 13-bit row address data. When the command interpretation section 24 detects a WR command or a RD command, the selector 28 selects the register 22 and outputs 4-bit command data, 2-bit bank designation data, and 12-bit data including 9-bit column address data, and subsequently selects the register 26 and outputs 1-bit column address data.

The register 30 temporarily stores and then outputs to the SDRAM 100 the command data, the bank designation data, and the address data output from the selector 28. The register 30 may be configured by a 19-bit register, for example. When the command data is an ACT command, the register 30 stores the 4-bit command data, the 2-bit bank designation data, and the 13-bit row address data. When the command data is a WR command or a RD command, the register 30 stores the 4-bit command data, the 2-bit bank designation data, and 13-bit data including 10-bit column address data. Each bit of the register 30 is connected to each of the plurality of terminals of the SDRAM 100 for outputting the command data, the bank designation data, and the address data in parallel.

When a WR command or a RD command, and column address data are stored in the register 30, 3 or less bit command data can be stored in the register 30 in addition to the 4-bit command data, the 2-bit bank designation data, and the 10-bit column address data. For example, the 3 or less bit command data may be 1-bit auto precharge command data, which can be stored in one bit contiguous to the 10-bit column address data.

The data I/F 40 temporarily stores the data output from the signal processing section 10 and then writes the data in the SDRAM 100. The data I/F 40 also temporarily stores the data read from the SDRAM 100 and then outputs the data to the signal processing section 10. The data I/F 40 performs data reading and data writing with respect to the SDRAM 100 in accordance with output of the row address data and the column address data performed by the address conversion section 21.

Figure 3:
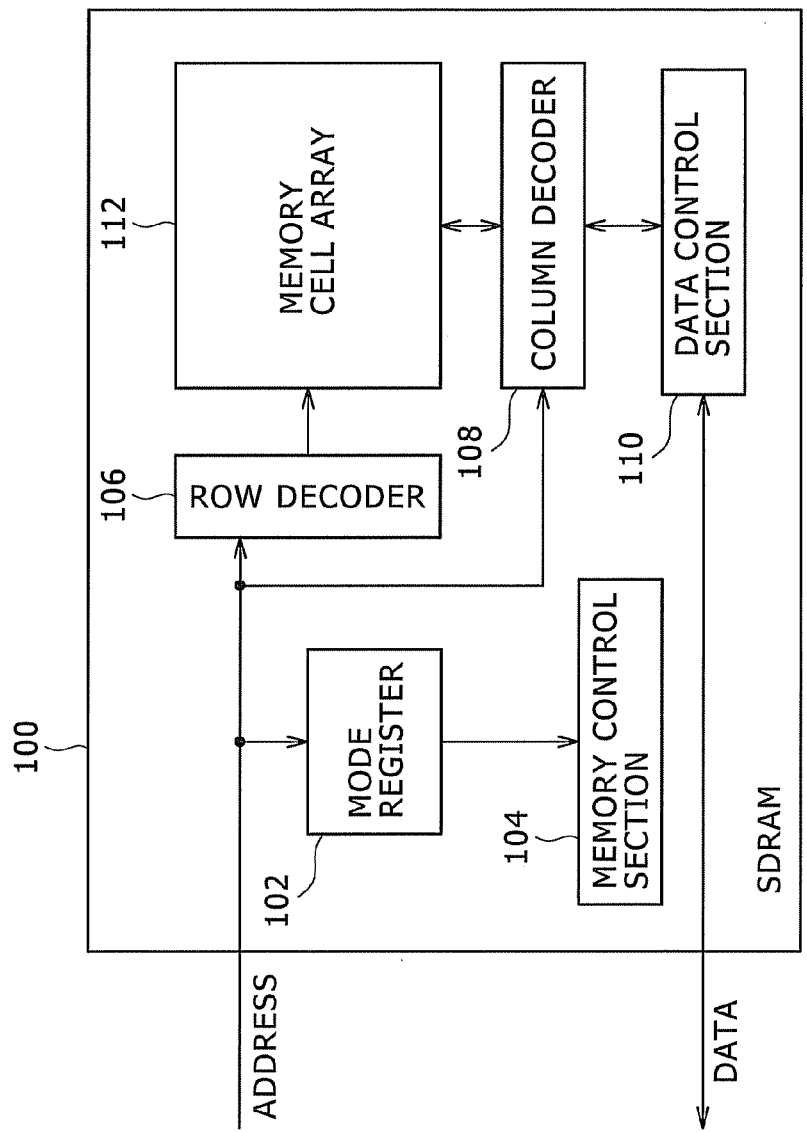
FIG. 3 is a view showing a structure of an SDRAM 100 according to the embodiment of the present invention.

The SDRAM 100 is a memory cell array formed by row addresses and column addresses. FIG. 3 shows a structure of the SDRAM 100 which includes a mode register 102, a memory control section 104, a row address decoder 106, a column address decoder 108, a data control section 110, and a memory cell array 112.

The mode register 102 stores the command data output from the register 30. For example, the mode register 102 can be configured by a 6-bit register and stores the 4-bit command data and the 2-bit bank designation data.

The memory control section 104 controls the operation of the SDRAM 100 in accordance with the command data stored in the mode register 102. For example, when the command data is an ACT command, the memory control section 104, determining that the address data to be input is row address data, controls the SDRAM 100 such that the address data is to be input in the row address decoder 106. On the other hand, when the command data is a WR command or a RD command, the memory control section 104, determining that the address data to be input is column address data, controls the SDRAM 100 such that the address data is to be input in the column address decoder 108.

The row address decoder 106 decodes the address data output from the address conversion section 21 to designate a row address of the memory cell array 112. When the SDRAM 100 has a storage capacity of 256 Mbits (16 Mwords×16 bits) or 512 Mbits (32 Mwords×16 bits), the row address decoder 106 performs decoding based on 13-bit address data.

The column address decoder 108 decodes the address data output from the address conversion section 21 to designate a column address of the memory cell array 112. When the SDRAM 100 has a storage capacity of 256 Mbits, the column address decoder 108 performs decoding based on 9-bit address data. When the SDRAM 100 has a storage capacity of 512 Mbits, the column address decoder 108 performs decoding based on 10-bit address data.

The data control section 110, which is connected with the data I/F 40, performs data writing and data reading with respect to the memory cell array 112 at the addresses designated by the row address decoder 106 and the column address decoder 108 at a timing instructed by the memory control section 104.

The memory cell array 112 is formed of a plurality of memory cells arranged in a matrix structure and holds the data output from the data control section 110. The memory cell array 112 preferably includes a plurality of memory cell matrices which are called banks, and is preferably formed of four banks (which are not shown) in the present embodiment. The memory control section 104 designates one of the four banks based on the bank designation data stored in the mode register 102 for performing data writing and data reading with respect to the memory cell array 112.

Figure 4:
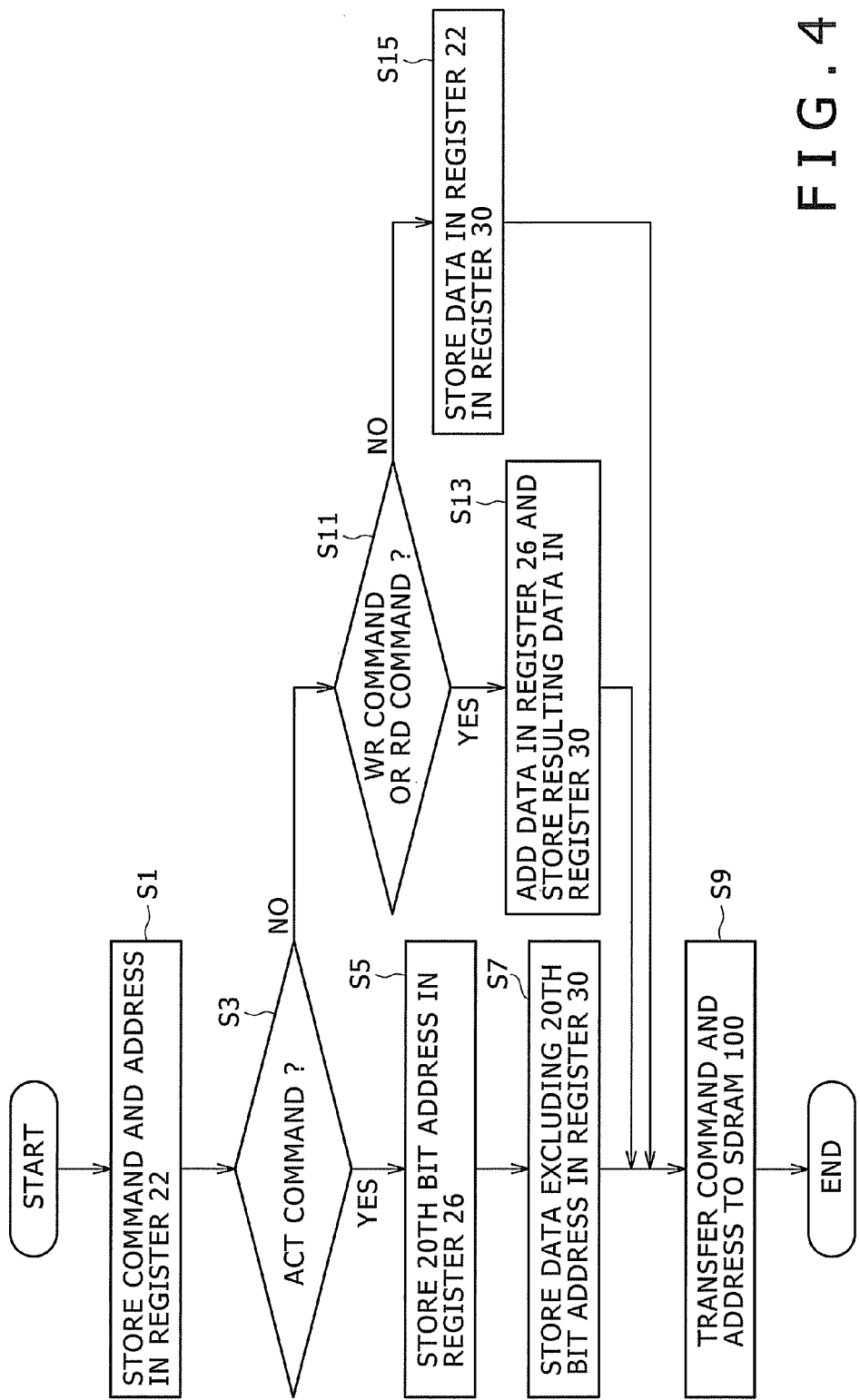
FIG. 4 is a flowchart of address conversion processing according to the embodiment of the present invention.

FIG. 4 is a flowchart showing the operation of the memory access section 20 in a case in which a SDRAM 110 having a storage capacity of 512 Mbits and 13-bit row address data and 10-bit column address data is used.

In step S1, command data and address data output from the address generation section 12 is stored in the register 22. At this time, the register 22 stores 20-bit data or 15-bit data.

In step S3, the command interpretation section 24 determines whether or not the command data stored in the register 22 is an ACT command. If the command data is an ACT command, the command interpretation section 24 determines that the address data stored in the register 22 is 13-bit row address data and 1-bit column address data, and the process proceeds to step S5.

Figure 2B:
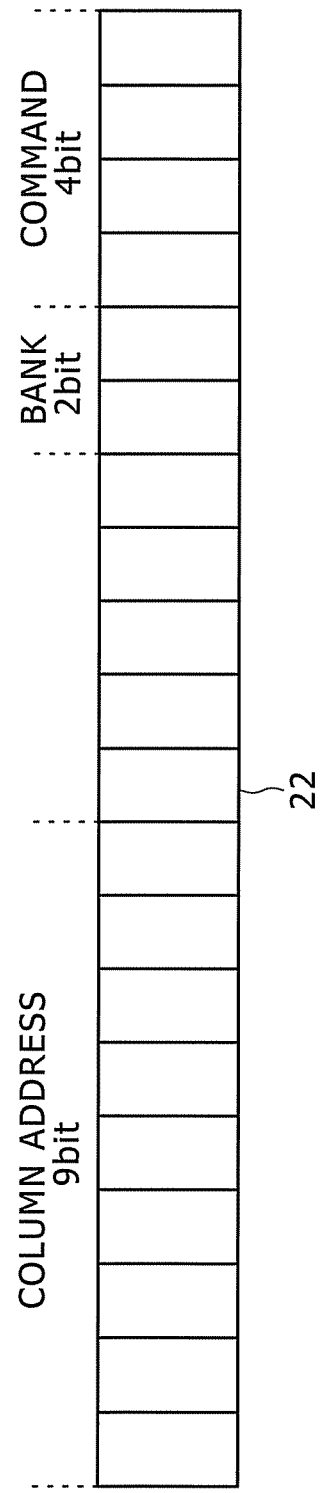

In step S5, the 1-bit column address stored in the register 22 is stored in the register 26. As shown in FIG. 2A, if the command data is an ACT command, in the address data following the bank designation data, the 20th bit from the leading end of the address data, i.e. the last 1 bit, indicates column address data. Accordingly, the 1-bit data to be added to column address data is stored in the register 26.

In step S7, at least the command data and the address data corresponding to 19 bits from the leading end is stored in the register 30 via the selector 28. The command interpretation section 24, when determining that the command data is an ACT command, controls the selector 28 such that the data stored in the register 22 is output. Consequently, the register 30 stores 4-bit command data, 2-bit bank designation data, and 13-bit address data.

In step S9, the command data and the address data stored in the register 30 is output and supplied to the SDRAM 100. Data writing and data reading with respect to the SDRAM 100 is then performed based on the command data and the address data output from the register 30.

In step S3, if the command interpretation section 24 determines that the command data stored in the register 22 is not an ACT command, the process proceeds to step S11. In step S11, the command interpretation section 24 determines whether or not the command data stored in the register 22 is a WR command or a RD command. If the command data is a WR command or a RD command, the command interpretation section 24 determines that the address data stored in the register 22 is 9-bit column address data, and the process proceeds to step S13.

In step S13, the 1-bit column address stored in the register 26 is added to the 9-bit column address stored in the register 22 to obtain at least 16-bit to 19-bit command and address data, which is then stored in the register 30 via the selector 28. Specifically, the command interpretation section 24, when determining that the command data is a WR command or a RD command, controls the selector 28 to output the 6-bit command and bank designation data and the 12-bit data including the 9-bit column address data stored in the register 22, and also to output the 1-bit column address data stored in the register 26. More specifically, the 1-bit column address data shown in FIG. 2A is inserted between the 2-bit bank designation data and the 9-bit column address data shown in FIG. 2B to obtain consecutive 10-bit column address data. As such, the 4-bit command data, the 2-bit bank designation data, and the 13-bit data including the 10-bit column address data, is stored in the register 30. After step S13, the process proceeds to the step S9 described above, where the command data and the address data stored in the register 30 is output to the SDRAM 100.

In step S11, if the command interpretation section 24 determines that the command data stored in the register 22 is neither a WR command nor a RD command, the process proceeds to step S15. In step S15, the data stored in the register 22 is output and stored in the register 30. After step S15, the process proceeds to step S9 described above, where the data stored in the register 30 is output to the SDRAM 100.

As described above, while the address generation section 12 outputs 9-bit column address data as in the related art signal processing circuit, the 9-bit column address is converted into 10-bit column address data in the address conversion section 21. Consequently, the signal processing circuit 1 can preferably access the large capacity SDRAM 100 employing 10-bit column addresses.

Here, the embodiment of the present invention is preferably applicable to a case in which a load on circuit design is lighter when the number of row address data is increased by 1 bit than when the number of column address data is increased by 1 bit with respect to the related art address generation section 212 which generates 13-bit row address data and 9-bit column address data. For example, when row address data and column address data is generated in accordance with the data format in the decoding processing of Mpeg video data as in the present embodiment, there are cases in which the load on circuit design is lighter when the row address data is increased by 1 bit than when the column address data is increased by 1 bit. In other words, there are cases in which a smaller load is placed on the circuit design when the row address data is increased by 1 bit in the address generation section 212 and the address conversion section is added in the memory access section 220 than by designing an address generation section which generates 13-bit row address data and 10-bit column address data. In such a case, by applying the present invention, the load on circuit design can be reduced to thereby suppress the cost of the signal processing circuit 1.

Figure 5:
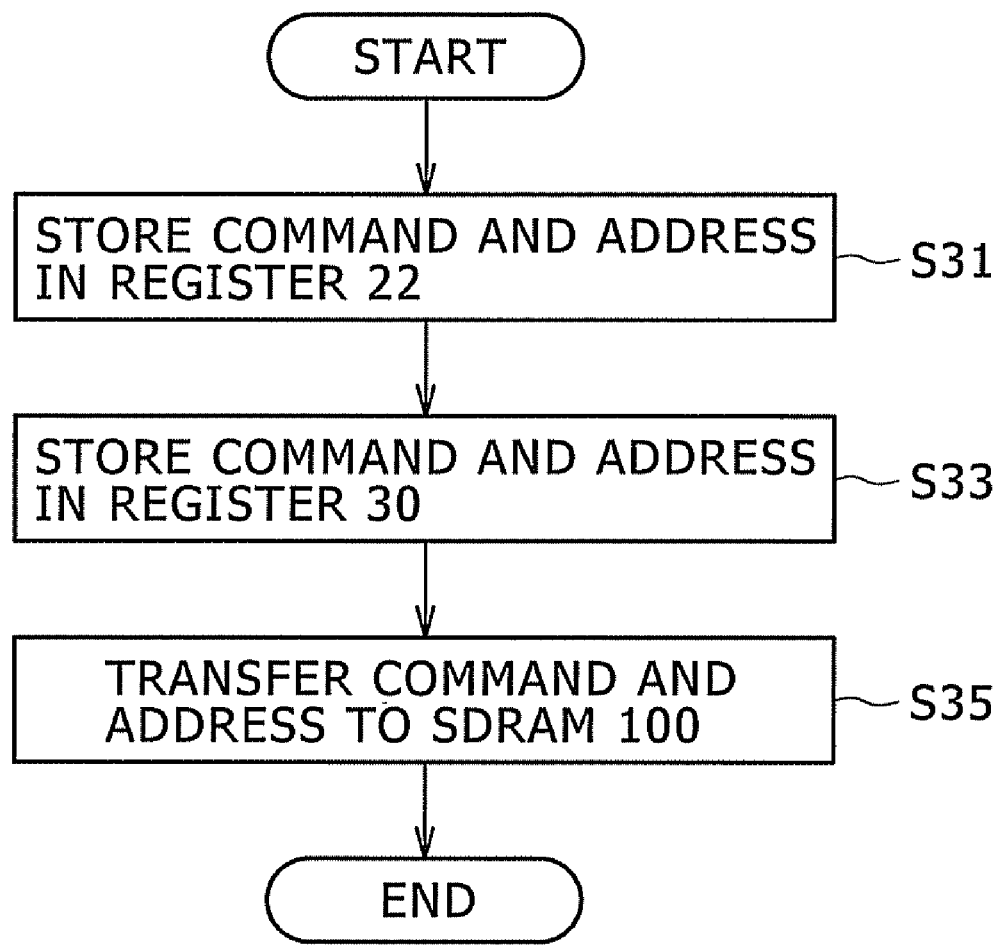
FIG. 5 is a flowchart of address conversion processing according to the embodiment of the present invention.
Figure 6:
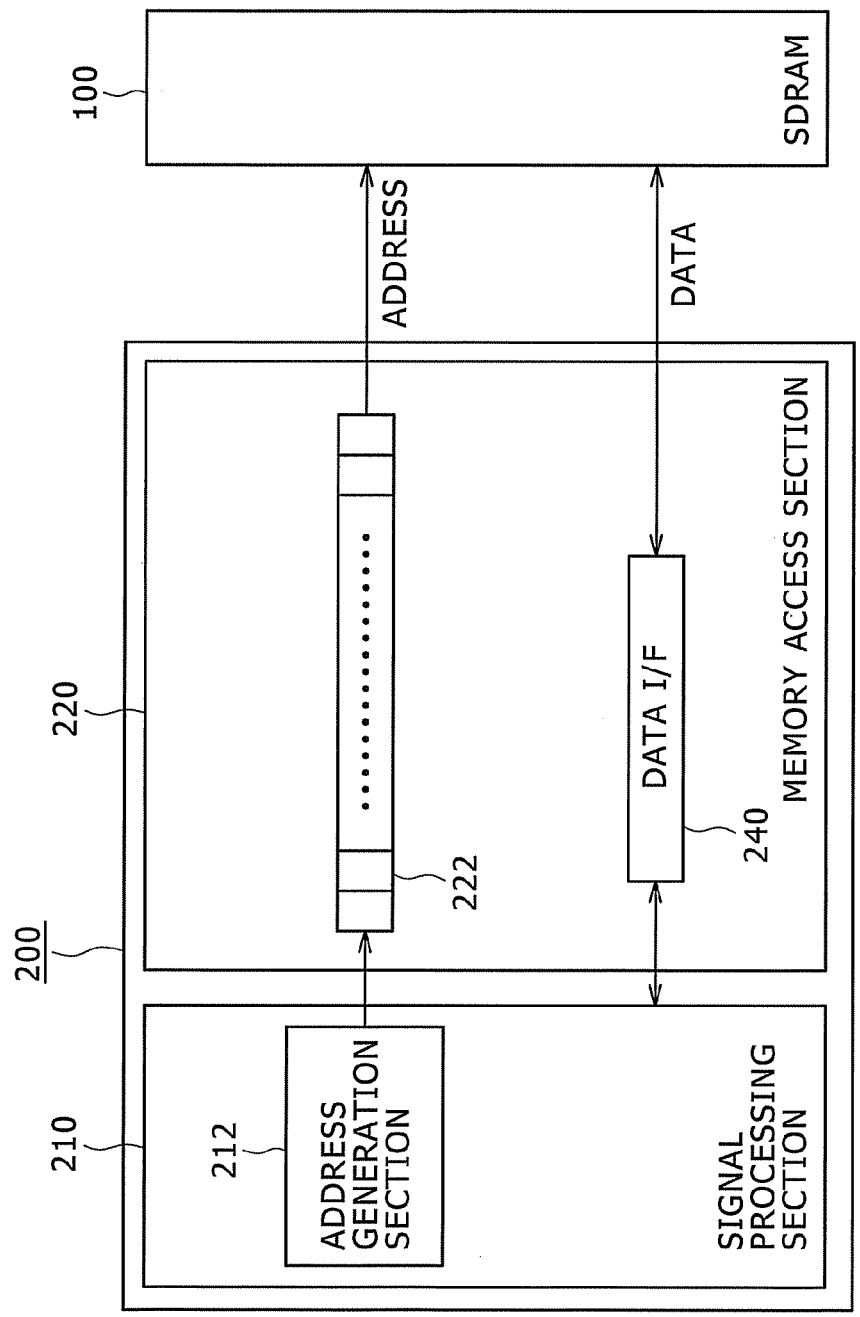
FIG. 6 is a view showing a structure of signal processing circuit in related art.

FIG. 5 is a flowchart showing the operation of the memory access section 20 in a case in which the SDRAM 100 has a storage capacity of 256 Mbits and employs 13-bit row address data and 9-bit column address data. When 9-bit column address data is employed, the address conversion section 21 does not perform the address conversion processing as described in FIG. 4 and therefore the register 22 and the register 20 function as a series of shift registers.

In step S31, the command data and the address data output from the address generation section 12 is stored in the register 22. At this time, the address generation section 12 generates 13-bit row address data and 9-bit column address data, and the register 22 stores 15-bit or 19-bit command and address data.

In step S33, the command and address data corresponding to at least 19 or 15 bits from the leading end is stored via the selector 28 in the register 30. At this time, the command interpretation section 24 need not perform determination concerning the command data stored in the register 22 and simply controls the selector 28 to output the data stored in the register 22 to the register 30.

In step S35, the command data and the address data stored in the register 30 is output to the SDRAM 100, which then performs data writing and data reading based on the command data and the address data output from the register 30.

As described above, as the address generation section 12 outputs 9-bit column address data as in the related art signal processing circuit, no address conversion processing is performed with respect to the 9-bit column address data in the address conversion section 21, and the 9-bit column address data is output. Consequently, the signal processing circuit 1 can also preferably access the SDRAM 100 having 9-bit column addresses.

As such, according to the embodiment of the present invention, with the use of the single common address generation section 12, access to SDRAMs 100 having different storage capacities can be enabled via the address conversion section 21. The number of bits of the row address data generated by the address generation section 12, and whether or not conversion of the row address data and the column address data is performed by the address conversion section 21, can be switched by changing setting of a register (not shown) which is separately provided. For example, when the SDRAM 100 employs 10-bit column address data, such a register is set such that the address generation section 12 generates 14-bit row address data and the address conversion section 21 performs conversion concerning the row address data and the column address data. On the other hand, when the SDRAM 100 employs 9-bit column address data, this register is set such that the address generation section 12 generates 13-bit row address data and the address conversion section 21 does not perform conversion concerning the row address data and the column address data.

While in the embodiment of the present invention an example in which a 512 Mbit SDRAM 100 having 13-bit row address and 10-bit column address is used, and an example in which a 256 Mbit SDRAM 100 having 13-bit row address and 9-bit column address is used, have been described, the present invention is not limited to these examples. The number of bits of the registers included in the address conversion section 21 can be set variably in accordance with the address data and the storage capacity of the external memory to be connected.

Further, while in the embodiment of the present invention, an example in which the memory access section 20 is connected only to the signal processing section 10 has been described, the present invention is not limited to this example. The memory access section 20 can be connected to a plurality of signal processing sections including the signal processing section 10 to convert the row address data and the column address data output from the respective signal processing sections and to output the converted row and column address data to the SDRAM 100. In this case, it is desirable that the memory access section 20 includes an arbiter for adjusting access to the SDRAM 100 from the plurality of signal processing sections.

While the preferred embodiment of the present invention has been described using specific terms, such description is for illustrative purposes only, and it is to be understood that changes and variations may be made without departing from the spirit or scope of the appended claims.

What is claimed is:

1. A signal processing circuit comprising:
   a signal processing section which generates and outputs first address data and second address data which differ from each other;
   an address conversion section which removes at least data of 1 bit of the first address data and outputs the resulting address data as third address data, and adds the removed data to the second address data and outputs the resulting address data as fourth address data; and
   a data interface which performs a writing operation or a reading operation of the data to and from a memory cell identified by a combination of the third address data and the fourth address data which are output from the address conversion section.

2. The signal processing circuit according to claim 1, wherein
   the address conversion section comprises:
      a first register;
      a second register which is connected to the first register for holding the at least 1 bit of the first address data stored in the first register; and
      a selector which is connected with the first register and the second register for selectively outputting the address data held by the first register and the second register.

3. The signal processing circuit according to claim 2, wherein
   the signal processing section adds command data for controlling the external memory to each of the first address data and the second address data and outputs the resulting address data, and
   the address conversion section further includes a command interpretation section for controlling the second register and the selector in accordance with the command data.

4. The signal processing circuit according to claim 1, wherein
   the external memory is a memory cell array having memory cells identified by row address data and column address data; and
   the third address data and the fourth address data correspond to the row address data and the column address data, respectively.

* * * * *